United States Patent [19]

Yamada et al.

[11] Patent Number: 4,796,439

[45] Date of Patent: Jan. 10, 1989

[54] AIR CONDITIONING SYSTEM

[75] Inventors: Tetsuo Yamada; Yoshinori Inoue; Sinji Miura; Masao Endo; Setsuo Kaneda; Yashutoshi Yoshida, all of Osaka, Japan

[73] Assignees: Takenaka Komuten Co., Ltd.; Sinko Kogyo Co., Ltd., both of Osaka, Japan

[21] Appl. No.: 113,761

[22] Filed: Oct. 28, 1987

[30] Foreign Application Priority Data

Nov. 5, 1986 [JP] Japan .................. 61-264309

[51] Int. Cl.$^4$ .................................. F25B 29/00
[52] U.S. Cl. ........................ 62/159; 62/238.6
[58] Field of Search ............. 62/59, 238.6, 434, 159; 237/2 B

[56] References Cited

U.S. PATENT DOCUMENTS

| | | | |
|---|---|---|---|
| 2,499,736 | 3/1950 | Kleen | 62/59 |
| 3,127,929 | 4/1964 | Ringquist | 62/159 X |
| 3,378,062 | 4/1968 | Ringquist et al. | 62/159 X |
| 3,407,620 | 10/1968 | Lodge | 62/159 |
| 4,143,642 | 3/1979 | Beaulieu | 62/238.6 X |
| 4,302,944 | 12/1981 | Gainer | 62/59 |
| 4,373,345 | 2/1983 | Tyree, Jr. et al. | 62/238.6 X |
| 4,383,419 | 5/1983 | Bottum | 62/238.6 |
| 4,481,790 | 11/1984 | Mattes | 62/238.6 |
| 4,513,580 | 4/1985 | Cooper | 62/238.6 X |
| 4,575,001 | 3/1986 | Oskarsson et al. | 62/238.6 X |

Primary Examiner—Lloyd L. King
Attorney, Agent, or Firm—Wenderoth, Lind & Ponack

[57] ABSTRACT

An air conditioning system for a building according to the present invention essentially has a first thermal storage tank as a cold thermal source which is installed at a high place in the building, a second thermal storage tank as a hot thermal source which is installed at a low place in the building, air conditioners which are installed at various levels between the first thermal storage tank and the second thermal storage tank, and heat pipes of a gravity type with which the air conditioners are connected to the first thermal storage tank and the second thermal storage tank. This system dispenses with passages for water, typically used as a thermal medium, at the places where air conditioners are installed. The system makes it possible to lower the capacities of the air conditioning equipment, especially the capacity of the regrigerator included in the cold thermal source equipment.

6 Claims, 2 Drawing Sheets

AIR CONDITIONING SYSTEM

BACKGROUND OF THE INVENTION

1. Field of the Invention

The present invention generally relates to an air conditioning system for buildings and, more particularly, to an air conditioning system which does not employ passages for water, typically used as a thermal medium, at the locations at which air conditioners are installed and which, moreover, permits the air conditioning equipment, especially the refrigerator, to function effectively with a relatively small capacity.

2. Description of the Related Art

Generally, in an air conditioning system in a building, water is used as a thermal medium for facilitating thermal conveyance between the thermal source equipment and the individual air conditioners. Such use of water, however, has presented a problem of water leakage from an air conditioner. Recently, therefore, for air conditioning systems for buildings, introduction of a volatile substance, such as freon, as a thermal medium to be passed directly between the thermal source equipment and the respective heat exchangers of the air conditioners, is being considered to reduce the problem of liquid leakage by virtue of the volatility of the substance.

Such a system using a volatile thermal medium comprises, for both cooling and warming, an outdoor unit which may be placed on the roof of a building and a plurality of indoor units at the air-conditioned locations, said outdoor unit being thermal source equipment including, for example, a refrigerator which also functions as a heat pump, and each of said indoor units being an air conditioner and a thermal medium conduit connecting the outdoor unit and the indoor unit.

An air conditioning system for a building using a volatile thermal medium and structurally designed as mentioned above is based on a direct expansion method according to which the thermal medium liquified by the condenser in the outdoor unit is supplied through the thermal medium conduit directly to the vaporizer in the indoor unit. In this system, the ice machine oil used in the compressor in the outdoor unit partly mixes in the form of mist into the thermal medium and circulates through said conduit. It is necessary for this ice machine oil, carried by the flow of the thermal medium to the indoor unit, to be recovered and returned to the compressor in the outdoor unit. This necessity imposes various restrictions upon the operation of the air conditioning system.

For example, whereas it is desirable that the variation of the air conditioning load at the air-conditioned location be met by the adjustment of the flow rate of the thermal medium supplied to the indoor unit, the conveyance of the ice machine oil for recovery requires the flow rate of the vapor in the thermal medium conduit to be maintained at approximately 6 m/sec. or more. There is a limit to throttling because of the need to maintain an adequate vapor flow. With normal throttling thus being unacceptable for the adjustment of the flow rate of the thermal medium, the only alternative means for controlling the output, available to indoor operators if the variation of the load necessitates it, is to open and close the throttle at short intervals repeatedly more or less simultaneously with turning on and off the fans in the individual air conditioners at short intervals. This method of control is in no way desirable.

The need to recover the ice machine oil also sets a strict limit to the number of indoor units that can be connected to one outdoor unit. In fact, the number of indoor units is limited to two or three for one outdoor unit.

The thermal source equipment, which is in fact a refrigerator, is required to have a relatively large capacity because of the need to cope with peaks of the load. Another factor which requires the capacity to be large is the fact that the thermal medium is circulated under a pressure applied by the compressor in said refrigerator.

SUMMARY OF THE INVENTION

With the problems in the foregoing description taken into consideration, the present invention has been developed to provide an advantageous means to solve them. Accordingly, an essential object of the invention is to provide an air conditioning system for buildings which, for both cooling and warming, dispenses with passages for water as a thermal medium at a location where an air conditioner is installed, permits the air conditioning equipment, especially the refrigerator, to have a relatively small capacity, permits the output to be controlled at each of the indoor units with ease, and permits one outdoor unit to be connected with indoor units in a larger number than in an air conditioning system of the direct expansion type.

An air conditioning system for buildings according to the present invention, designed to overcome the disadvantages of the prior art systems and to accomplish the foregoing objects of the invention, comprises:

a first thermal storage tank as a cold thermal reservoir which is installed at a high place, such as the roof, in an air-conditioned building;

a second thermal storage tank as a hot thermal reservoir which is installed at a low place, such as the basement, in the same building;

a plurality of air conditioners each of which is installed in an air-conditioned room or at a place close to it at a level between the first thermal storage tank as a cold thermal reservoir and the second thermal storage tank as a hot thermal source; and heat pipes of a gravity type which connect said air conditioner to the first heat storage tank and to the second heat storage tank.

It is preferable for the first thermal storage tank as a cold thermal reservoir to comprise an ice thermal storage tank.

Said heat pipes of a gravity type are essentially designed to allow thermal medium to circulate therethrough under a natural pressure generated by the phase change of said thermal medium. The circulation according to the present invention, however, is not restricted to natural circulation alone but can partly be accomplished by means for facilitating forced circulation, such as a pump, so as to supplement the natural circulating force or to adjust the circulating flow of thermal medium.

An air conditioning system according to the present invention is operated as follows.

A thermal medium, such as freon, is circulated through the heat pipes of a gravity type with the motive force for the circulation provided by a phase change and by gravity so as to transfer heat by natural circulation between the air conditioner at the air-conditioned location and each of the thermal reservoirs. For cooling, the thermal medium absorbs a thermal load at the air-conditioned location through the heat exchanger in the air conditioner, changes from liquid to vapor as it absorbs the heat, and rises through a heat pipe to the first thermal storage tank as a cold thermal reservoir. The thermal medium in the vapor phase is then condensed by cooling in the first thermal storage tank, descends through a heat pipe by gravity, and returns to the air conditioner. For warming, the thermal medium absorbs a thermal load at the air-conditioned location through the heat exchanger in the air conditioner, changes from vapor to liquid, and descends through a heat pipe by gravity to the second thermal storage tank as a hot thermal reservoir. The thermal medium in the liquid phase is then vaporized by being heated in the second thermal storage tank, and rises through a heat pipe to the air conditioner.

In an air conditioning system in a building according to the present invention, ice machine oil is not carried to an indoor unit nor is there any need to recover it because heat exchange takes place between a system in which thermal medium is forced to circulate through a thermal reservoir and a system in which thermal medium naturally circulates through heat pipes of a gravity type. And, the heat pipes constitute a circulatory system for the thermal medium and so does the thermal reservoir, each system being different from and independent of the other. Accordingly, there is no restriction with respect to the flow rate of the thermal medium which naturally circulates through the heat pipes of a gravity type, while the flow rate of thermal medium at each indoor unit can be controlled to correspond to the amount of heat exchange which is proportionate to the load at the respective air-conditioned rooms.

There is no particular limit to the number of indoor units for one outdoor unit where the conduit resistance of the heat pipes is small enough to allow the thermal medium to naturally circulate with ease. Since there is no need to recover ice machine oil, the flow rate of the thermal medium in the vapor phase has no minimum limit. An ice thermal storage tank used as the first thermal storage tank has a large thermal storage capacity for its weight, as compared with a water-based tank, so that the thermal storage tank can be light and there is no problem presented when installing the thermal storage tank at a high location, such as the roof of a building, where the weight is limited.

As is clear from the foregoing description, the advantages of an air conditioning system according to the present invention can be reduced to the following points.

Since the system requires no passages for water as a thermal medium where an air conditioner is installed, such as an air-conditioned room, water leakage does not occur at the location of the installation. Since the thermal medium used in the heat pipes is a volatile substance such as freon, there is little likelihood of liquid leakage causing problems because the substance vaporize in a short time when a leakage occurs. Since a thermal reservoir is used for the cold thermal source, the system can cope satisfactorily with peaks of the air conditioning load even if the capacity of the refrigerator which cools the thermal reservoir is small. The system makes it possible to adjust the the flow rate of the thermal medium over a wide range at each indoor unit and, accordingly, the control of the air conditioning capacity can be performed easily. The system permits more indoor units, which can be connected with one outdoor unit, to be used than in an air conditioning system of the direct expansion type.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE PREFERRED EMBODIMENTS

Figure 1:
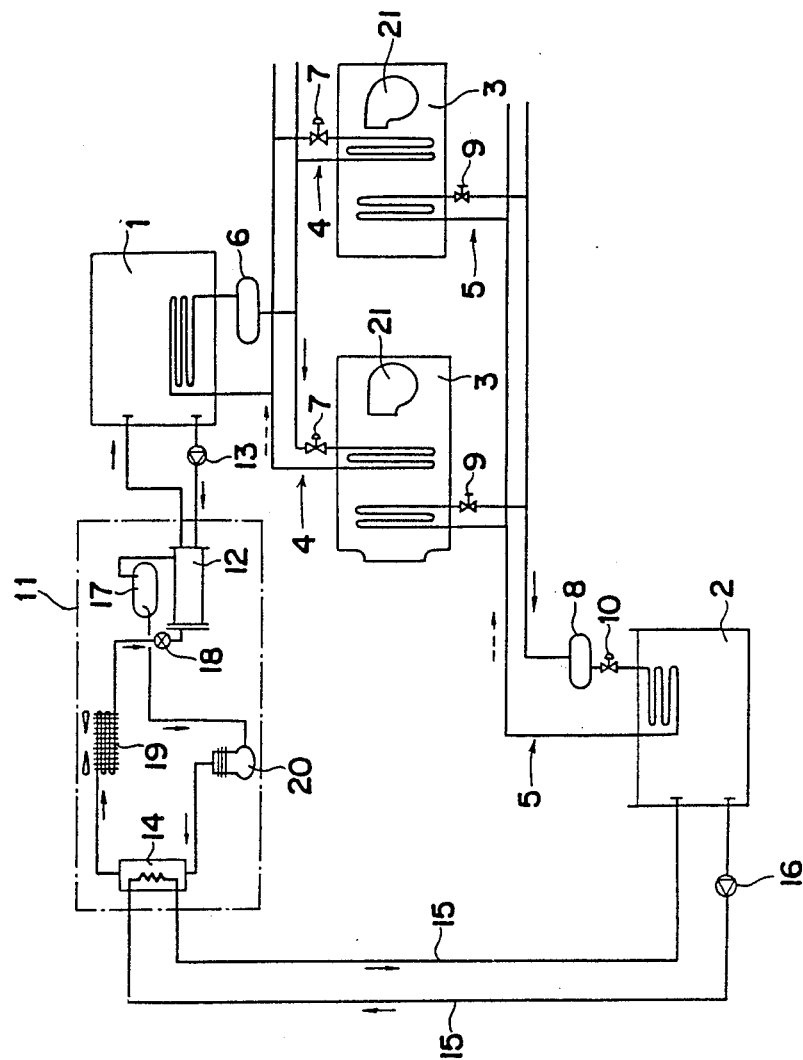
FIG. 1 is a schematic diagram of an air conditioning system for buildings according to a first embodiment of the present invention.

Before the description of the present invention proceeds, it is to be noted that like parts are designated by like reference numerals and symbols throughout the accompanying drawings.

THE FIRST EMBODIMENT

Referring now to the drawings, an air conditioning system for buildings of a first embodiment of the present invention is shown in FIG. 1 in schematic form. The installations in this system are positioned according to a specification with respect to height. The first thermal storage tank as a cold thermal source, i.e. an ice type thermal reservoir 1, is installed at a high place, such as the roof, whereas the second thermal storage tank as a hot thermal source, i.e. a hot water type thermal reservoir 2, is installed at a low place, such as the basement of a building. The ice type thermal reservoir 1 is designed to store both sensible heat and latent heat, which is approximately 80 times as large in terms of thermal energy as the sensible heat, and has a larger thermal storage capacity than a cold water type thermal reservoir which only stores sensible heat. An ice type thermal reservoir which has much smaller dimensions than a cold water type thermal reservoir could have as large a thermal storage capacity as the cold water type thermal reservoir, and therefore, it is convenient for an ice type thermal reservoir to be installed on the roof of a building. The air conditioners 3, each being an indoor unit, are arranged at various heights and are installed at an air-conditioned location on each floor, between the ice type thermal reservoir 1 and the hot water type thermal reservoir 2. Heat pipes of a gravity type 4, 5 connect each air conditioner 3 at each air-conditioned location with each of the thermal storage tanks 1, 2. The thermal medium such as freon (the solid arrow denotes liquid flow and the broken arrow vapor flow in the chart) in the heat pipes 4, 5 undergoes a phase change by undergoing heat exchange in each air conditioner 3 and either of the thermal storage tanks 1 or 2 and circulates in the heat pipes 4, 5 in a manner comprising a back and forth flow there between. In the heat pipe 4 extending through the ice type thermal reservoir 1, there is provided a liquid receptable 6 in a section thereof passing thermal medium in the liquid phase and at a position upstream of liquid branches extending to different air conditioners 3, and there is also provided a flow adjusting valve 7 in each of the downstream pipes leading to the respective air conditioners 3. This arrangement enables each air conditioner to be provided with an amount of thermal medium from liquid receptacle 6 proportionate to the cooling load at the air-conditioned location. In the heat pipe 5 extending through a hot water type thermal reservoir 2, there is provided a liquid receptacle 8 in a section thereof passing liquid thermal medium and disposed at a position downstream from the point at which the liquid thermal medium discharged from each air conditioner 3 meets before circulating to the hot water thermal reservoir 2. In the same heat pipe 5, there is provided a flow adjusting valve 9 in a section thereof passing liquid thermal medium. Also in the upstream section passing liquid thermal medium in the same heat pipe 5, there is provided a flow adjusting valve 9 in each of the pipes extending from the respective air conditioners 3, and a flow adjusting valve 10 to control the total flow of the liquid thermal medium at the downstream section. It is not water but a volatile substance, such as freon, that is passed as thermal medium to the air-conditioned room. There is little likelihood that the thermal medium will spoil the area where the air conditioner is installed. Even if leakage occurs, the substance will be vaporized quickly.

The thermal source device to provide the thermal storage tanks with cold energy or hot energy is a heat pump chiller 11 with an ice-making machine 12. A slurry pump 13 is provided between the ice type thermal reservoir and the ice making machine 12 so that ice made by the ice-making machine 12 is forced into said ice type thermal reservoir 1 by the slurry pump 13. A hot water heat recovery pipe 15 is provided between the heat exchanger 14, which is incorporated in the condensation device in the heat pump chiller 11, and the hot water type thermal reservoir 2. The pump 16, attached to said hot water heat recovery pipe 15, forces hot water into the hot water type thermal reservoir 2.

It is preferable to operate the heat pump chiller 11 at night, when electric power is available at a reduced rate, so as to store the thermal energy obtained in the thermal storage tank 1 or 2. The thermal energy stored in the thermal storage tank 1 or 2 is, in principle, used to meet the air-conditioning load required during the day. In a different method wherein additional thermal source equipment is connected directly to each air conditioning device 3 (not shown in drawings), the load put on the additional thermal source equipment can be reduced by combining the output of the thermal source equipment with the thermal energy obtainable from the thermal storage tank 1 or 2. When this additional thermal source is used as the main thermal source and the energy from the thermal storage tank is used as supplemental energy, the capacity of the additional thermal source equipment to meet the peak load can be reduced. The same effect can be achieved without using supplemental thermal sources: the vaporizer (the vaporizer contained in said ice-making machine 12) of the heat pump chiller 11 is divided into two alternative systems, the vaporizer in one system being led to the ice-making machine 12 in a manner similar to the above example and the vaporizer in the other system being led directly to the heat pipe 4, apart from the ice type thermal reservoir 1 as a cold thermal source to directly condense the thermal medium in the heat pipe 4. The above description pertains to a refrigeration circuit. Also, for warming, the condenser in the heat pump chiller 11 can be divided into two alternative systems, one system being led to the hot water type thermal reservoir 2 and the other system being led directly to the heat pipe 4 so as to form a hot thermal source to directly vaporize the thermal medium in the heat pipe 4, apart from the hot water type thermal reservoir 2, and the same effect as mentioned above can be obtained. The performance coefficient of the thermal storage operation for cooling is approximately 2.5, but the performance coefficient when the heat pipe 4 is directly cooled is expected to be approximately 4.5.

In the drawings 17 denotes an accumulator, 18 an expansion valve, 19 an air-heat exchanger, 20 a compressor, and 21 a fan.

THE SECOND EMBODIMENT

Figure 2:
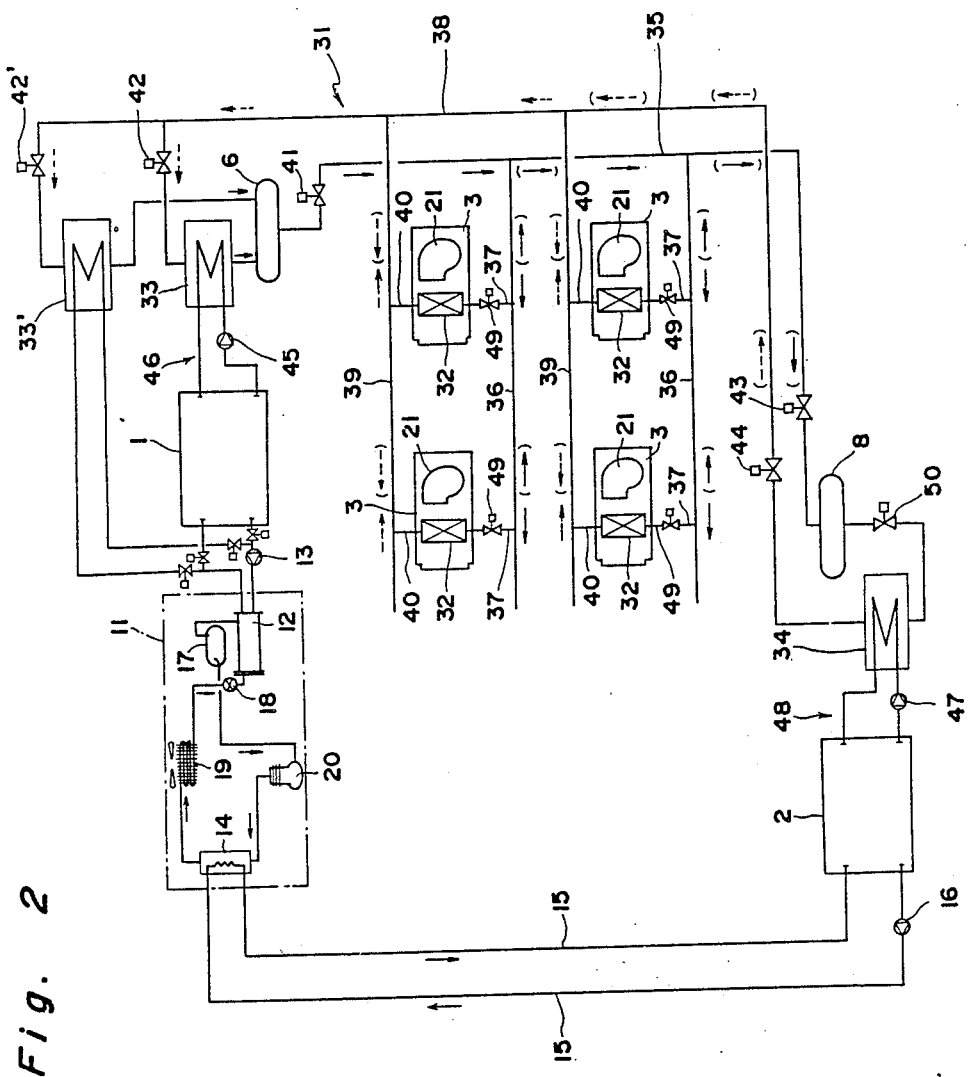
FIG. 2 is a schematic diagram of an air conditioning system for buildings according to a second embodiment of the present invention.

FIG. 2 is a schematic diagram of an air conditioning system for buildings of a second embodiment of the present invention. In FIG. 1, the heat pipes 4 are installed separately from the heat pipes 5, the former for cooling and the latter for warming. In the second embodiment, the same single heat pipes of a gravity type 31 are used for both cooling and warming by using a switching operation. Accordingly, each air conditioner 3 has only one heat exchanger 32. The thermal medium conduits comprising heat pipes of a gravity type 31 include an upright main conduit 35 for liquid and an upright main conduit 38 for vapor which extend between the heat exchanger of the cold thermal source (the heat exchanger for condensing thermal medium in the heat pipe 32 is hereinafter abbreviated as condenser) 33, 33' located at a high place in a building and the heat exchanger of the hot thermal source (the heat exchanger to vaporize the thermal medium in the heat pipes 31 is hereinafter abbreviated as vaporizer) 34 located at a low place in a building. Furthermore, at each floor, a horizontal main pipe 36 for liquid branches out from an upright main pipe 35 for liquid and a horizontal main pipe 39 for vapor branches out from an upright main pipe 38 for vapor. From the horizontal main pipes 36 for liquid and from the horizontal main pipes 39 for vapor, branch pipes 37 for liquid and branch pipes 40 for vapor extend to the respective air conditioners to form thermal medium circuits. In the drawing, the solid arrows denote pipes for liquids and the direction in which the liquid flows the broken arrows denote pipes for vapor and the direction in which the vapor flows, all during the cooling operation. The arrows in parentheses denote the flow of thermal medium during a warming operation. Switching between cooling and warming operations is done by the valves 41, 42, 42', 43, and 44 connected to the upright main pipe 35 for liquid and the upright main pipe 38 for vapor. Reference numeral 50 denotes a thermal medium flow adjusting valve for facilitating the warming operation. The switching valve 41 is connected to the horizontal main pipe 36 for liquid at a position higher than the highest branching point, the switching valves 42 and 42' are connected to the horizontal main pipe 39 for vapor at positions higher than the highest branching points, the switching valve 43 is connected to the horizontal main pipe 36 for liquid at a position lower than the lowest branching point, and the switching valve 44 is connected to the horizontal main pipe 38 for vapor at a position lower than the lowest branching point. For facilitating the cooling operation, the switching valves 41, 42, 42' are opened, whereas the switching valves 43, 44 are closed. For facilitating the warming operation, the switching valves 43, 44 are opened, whereas the switching valves 41, 42, 42' are closed. The same heat pipes of a gravity type 31 are used for both the cooling and the warming operations by switching the respective thermal medium circuit, and therefore, only one heat exchanger 32 is required in each air conditioner 3. And, because the supply of cold thermal medium to the heat exchanger 32 can be adjusted, the system needs only one flow rate adjusting valve 49 to serve each single heat exchanger 32.

To cool the thermal medium in the heat pipe 31 there are condensers 33 and 33' extending in parallel. One condenser 33 is supplied with chilled water through a chilled water pipe system 46, with a chilled water pump 45 operatively connected between the ice type thermal reservoir 1 and its condenser, and cools the condensation section of the heat pipe 31 at a top end thereof. The ice type thermal reservoir 1 is connected selectively with an ice slurry pipe system (a slurry pump 13 is provided) which extends from the ice-making machine 12 in a heat pump chiller 11 and branches out to be connected with said ice type thermal reservoir. The other end of the ice slurry pipe system is connected directly with the condenser 33'. The chilled water pump 45 is structurally the same as the slurry pump, and is therefore capable of pumping ice slurry as well as cold water. The ice-making machine 12 can be used as a water chiller by raising the vaporizing point. Then the ice type thermal reservoir 1 is used as a chilled water type thermal reservoir, the ice slurry pipe system as a chilled water pipe system, and the slurry pump 13 as a chilled water pump.

With condensers 33, 33' installed in parallel, the system enables the storage of thermal energy in the ice type thermal reservoir by utilizing electric power at a reduced rate at night. When the load is low, the operation utilizes only the condenser 33, and when high, both condensers 33, 33' can be used.

The vaporizer 34 for the heat pipe 31 is supplied with hot water from a hot water pipe system 48 which, having a hot water pump 47, reciprocally circulates hot water between a hot water type thermal reservoir and the vaporizer 34. The vaporizer heats the vaporizing section of the heat pipe 31 at a lower end thereof.

Although the present invention has been fully described by way of example with reference to the accompanying drawings, it is to be noted here that various changes and modifications will be apparent to those skilled in the art. Therefore, unless such changes and modifications otherwise depart from the scope of the present invention, they should be construed as included therein.

What is claimed is:

1. An air conditioning system for a building, said system comprising:
    a cold thermal source at which a relatively low temperature is developed, said cold thermal source comprising a first thermal storage tank disposed at a relatively high location on the building;
    a hot thermal source at which a relatively high temperature is developed as compared to the temperature developed at said cold thermal source, said hot thermal source comprising a second thermal storage tank disposed at a relatively low location on the building as compared to the location at which said first thermal storage tank is disposed;
    a plurality of air conditioners for air conditioning respective areas in the building, each of said air conditioners disposed at a respective location between said first and said second thermal tanks; and
    gravity type heat piping extending between and operatively connecting said plurality of air conditioners with said cold and said hot thermal sources for allowing thermal medium to circulate between said cold thermal source and said plurality of air conditioners and between said hot thermal source and said plurality of air conditioners.

2. An air conditioning system for a building as claimed in claim 1, wherein said first thermal storage tank is an ice type thermal reservoir.

3. An air conditioning system for a building as claimed in claim 1, and further comprising a heat pump chiller operatively connected to said hot and said cold thermal sources for cooling said first thermal storage tank and for heating said second thermal storage tank.

4. An air conditioning system for a building as claimed in claim 3,
    wherein said cold thermal source further comprises a heat exchanger operatively connected in parallel to said first thermal storage tank, said heat pump chiller comprises a vaporizer, said heat exchanger is operatively connected to said vaporizer, and said gravity type heat piping is operatively connected to said cold thermal source at said heat exchanger thereof.

5. An air conditioning system for a building as claimed in claim 1, wherein said gravity type heat piping comprise first heat piping and second heat piping, said first heat piping connecting said air conditioners with said first thermal storage tank and said second heat piping connecting said air conditioners with said second thermal storage tank.

6. An air conditioning system as claimed in claim 1,
    wherein said gravity type heat piping comprises upright main liquid piping having an upper end connected to said cold thermal source and a lower end connected to said hot thermal source, upright main vapor piping having an upper end connected to said cold thermal source and a lower end connected to said hot thermal source, horizontal main liquid piping extending between and operatively connecting said plurality of air conditioners and said upright main liquid piping, horizontal main vapor piping extending between and operatively connecting said plurality of air conditioners and said upright main vapor piping, and
    further comprising a respective valve disposed at each of said upper and said lower ends of said main upright liquid piping and of said main upright vapor piping for selectively opening and closing said main upright liquid piping and said main upright vapor piping to said cold and said hot thermal sources.

* * * * *